A. H. WORREST.
AXLE NUT.
APPLICATION FILED DEC. 3, 1914.
1,177,077.
Patented Mar. 28, 1916.
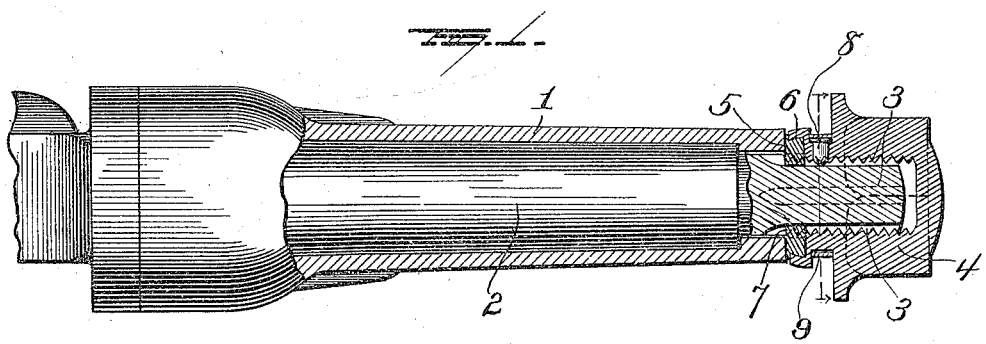
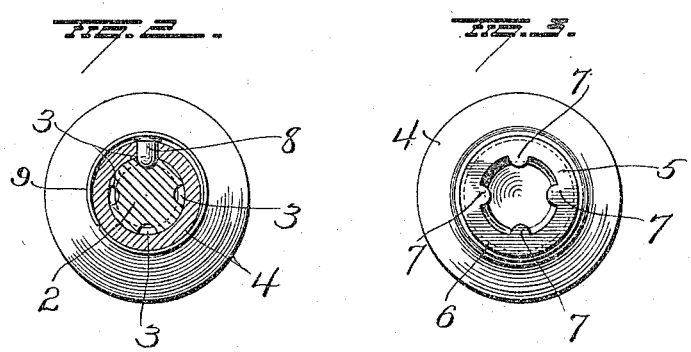
WITNESSES
INVENTOR
A. H. Worrest
Attorney.
THE COLUMBIA PLANOGRAPH CO., WASHINGTON, D. C.

UNITED STATES PATENT OFFICE.

ALFRED H. WORREST, OF LANCASTER, PENNSYLVANIA.

AXLE-NUT.

1,177,077.  Specification of Letters Patent. Patented Mar. 28, 1916.

Application filed December 3, 1914. Serial No. 875,315.

*To all whom it may concern:*

Be it known that I, ALFRED H. WORREST, a citizen of the United States, and a resident of Lancaster, in the county of Lancaster and State of Pennsylvania, have invented certain new and useful Improvements in Axle-Nuts; and I do hereby declare the following to be a full, clear, and exact description of the invention, such as will enable others skilled in the art to which it appertains to make and use the same.

My invention relates to an improvement in axle nuts, the object being to provide a nut that will stay at any point on the thread of the axle spindle, and which can be screwed up to compensate for wear of washers in an ordinary axle or the wear of balls and races of a ball bearing axle, the said nut being retained against movement by any force transmitted from the revolving vehicle wheel, and it consists in the parts and combination of parts as will be more fully explained and pointed out in the claims.

In the accompanying drawings, Figure 1 is a view in section partly in elevation of an axle spindle and box showing my improvement applied thereto; Fig. 2 is an enlarged view in section through the nut and end of the spindle, and Fig. 3 is an end view of the nut showing the washer mounted to rotate therein.

1 represents an axle box and 2 the axle spindle therein, the latter being threaded at its outer end as is customary and provided with one or more, preferably a plurality, of grooves 3 extending longitudinally throughout said threaded portion.

4 is the nut provided at its inner end with a recess concentric with the bore of the nut for the reception of the washer 5. This washer is circular and is provided in its periphery with a circumferential groove 6, into which the wall of the seat for said washer is upset so as to lock the washer to the nut, and prevent a separation of the parts, but not interfere with the free rotation of the washer within its seat in the nut, or the rotation of the nut independently of the washer.

The hole in the washer is concentric with the bore of the nut, and it is provided with a series of inwardly projecting lugs 7 preferably one for each groove 3 in the spindle, which lugs are adapted to rest within said groove, so that, when the nut with its attached washer is applied to the threaded end of the spindle, the washer will be held against rotation, by the engagement of the lugs 7 with the walls of the grooves 3, thus absolutely preventing the box 1 or other rotating part of the hub from imparting a rotary or turning movement to the nut.

The washer 5 preferably projects slightly beyond the inner end of the nut, so that when the nut is screwed home, the washer will bear against the box or spindle and take all the end thrust contact from the nut direct.

In order to prevent the nut from accidentally turning I have provided same with a pin 8 which projects into the bore of the nut and normally rests with its inner end in one of the grooves in the spindle, the pin being yieldingly held in such position by the split ring spring 9, which will give or yield sufficiently to permit the nut to be secured to or removed from the threaded end of the spindle, but which will offer sufficient resistance to the turning movement of the nut as to prevent any such movement except when a positive power is applied in screwing it on or off.

I have shown the inner face of the nut, or that part thereof which is recessed to receive the washer, considerably reduced in diameter, with the flat split ring spring 9, which forms a yielding support for the pin 8, encircling said reduced portion, but this detail is not essential. I would also have it understood that I do not confine the application of the nut and washer to an axle box which bears directly against the washer, as the improvement can be applied to any wheel mounting and operate to prevent any rotating part from transmitting its movement to the nut.

With my improvement the washer can turn in the nut or nut can turn on the washer, but when the device is applied to a grooved spindle as shown, the washer will be held from turning movement by its engagement with the groove in the spindle, and hence absolutely prevents any rotating part from imparting its movement to the nut.

It is evident that many slight changes might be resorted to in the relative arrangement of parts shown and described without departing from the spirit and scope of my invention. Hence I would have it understood that I do not wish to confine myself to the exact construction and arrangement of parts shown and described but, Having fully described my invention what I claim as new and desire to secure by Letters-Patent, is:—

1. The combination of a spindle for a vehicle wheel having a threaded and grooved end, a nut having means engaging said groove whereby the nut may be turned on or off with a wrench, but which will be held on the threaded end against movement with the vehicle wheel, and a washer carried by the inner end of the nut, and provided with a lug to enter the groove in the spindle, the nut being free to turn on said washer.

2. The combination of a spindle for a vehicle wheel having a threaded and grooved end, a nut having yielding means engaging said groove whereby the nut may be turned on or off with a wrench, but which will be held on the threaded end of the spindle against movement with the vehicle wheel, and a washer secured within a recess in the inner end of the nut and provided with a lug to enter the groove in the spindle, the nut being free to turn on said washer.

3. The combination of a spindle for a vehicle wheel having a threaded and grooved end, a nut having yielding means engaging said groove whereby the nut may be turned on or off with a wrench but which will be held on the threaded end of the spindle against movement with the vehicle wheel, and a washer secured within a recess in the inner end of the nut and provided with an integral lug to enter the groove in the spindle, the nut being free to turn on said washer.

4. The combination of a nut having a reduced inner end and provided with a hole through said reduced end, a pin within said hole and adapted to project into the bore of the nut to enter a groove in the threaded axle spindle or other part to which the nut is secured, a spring carried by said reduced portion of the nut and yieldingly holding the pin in place, and a washer mounted to rotate in the inner reduced end of the nut and projecting beyond the face of the said reduced end.

In testimony whereof, I have signed this specification in the presence of two subscribing witnesses.

ALFRED H. WORREST.

Witnesses:
MABEL MAE KLINE,
FLORENCE I. MENTZER.

Copies of this patent may be obtained for five cents each, by addressing the "Commissioner of Patents, Washington, D. C."